US008767939B2

(12) United States Patent
Pitiot et al.

(10) Patent No.: US 8,767,939 B2
(45) Date of Patent: Jul. 1, 2014

(54) TELEPHONIC SERVICE AND POWER SUPPLY STATUS MANAGEMENT OF A COMMUNICATION TERMINAL DEPENDING ON THE PRESENCE OF A USER

(75) Inventors: Yann Pitiot, Colombes (FR); Daniel Ferrero, Colombes (FR)

(73) Assignee: Alcatel Lucent, Paris (FR)

( * ) Notice: Subject to any disclaimer, the term of this patent is extended or adjusted under 35 U.S.C. 154(b) by 65 days.

(21) Appl. No.: 13/201,594

(22) PCT Filed: Jan. 22, 2010

(86) PCT No.: PCT/FR2010/050096
§ 371 (c)(1),
(2), (4) Date: Oct. 24, 2011

(87) PCT Pub. No.: WO2010/092270
PCT Pub. Date: Aug. 19, 2010

(65) Prior Publication Data
US 2012/0051527 A1    Mar. 1, 2012

(30) Foreign Application Priority Data

Feb. 16, 2009    (FR) .................................... 09 50985

(51) Int. Cl.
*H04M 3/42*    (2006.01)
(52) U.S. Cl.
USPC ................................. 379/211.02; 379/201.1
(58) Field of Classification Search
USPC ............. 379/88.22, 211.02, 142.07; 713/320; 455/550.1
See application file for complete search history.

(56) References Cited

U.S. PATENT DOCUMENTS

| 6,233,448 B1 | 5/2001 | Alperovich et al. |
| 6,415,143 B1 | 7/2002 | Andre |
| 6,457,132 B1 * | 9/2002 | Borgendale et al. ........... 713/320 |
| 7,203,294 B2 * | 4/2007 | Carnazza et al. ........ 379/142.07 |
| 2002/0052225 A1 | 5/2002 | Davis et al. |
| 2004/0097218 A1 | 5/2004 | Vossler |
| 2004/0156487 A1 | 8/2004 | Ushiki et al. |
| 2005/0215243 A1 | 9/2005 | Black et al. |

(Continued)

FOREIGN PATENT DOCUMENTS

| EP | 0 893 904 A1 | 1/1999 |
| JP | 2006 072446 A | 3/2006 |
| WO | WO 98/07265 A1 | 2/1998 |
| WO | WO 03/028342 A2 | 4/2003 |

OTHER PUBLICATIONS

International Search Report for PCT/FR2010/050096 dated Apr. 8, 2010.

*Primary Examiner* — Fan Tsang
*Assistant Examiner* — Van D Huynh
(74) *Attorney, Agent, or Firm* — Fay Sharpe LLP

(57) ABSTRACT

To manage a continuity of telephone service in relation to a user associated with a communication terminal (TC) and with at least one communication device (DC), a server (SC) connected to the communication terminal and to the communication device is able to power off the communication terminal following detection of an event relating to the absence of the user close to the communication terminal, and to enable call forwarding from the communication terminal to the communication device based on a user profile. The server is also able to power on the communication terminal following detection of an event relating to the presence of the user close to the communication terminal, and to disable the call forwarding from the communication terminal to the communication device.

10 Claims, 2 Drawing Sheets

(56) References Cited

U.S. PATENT DOCUMENTS

Figure 1:
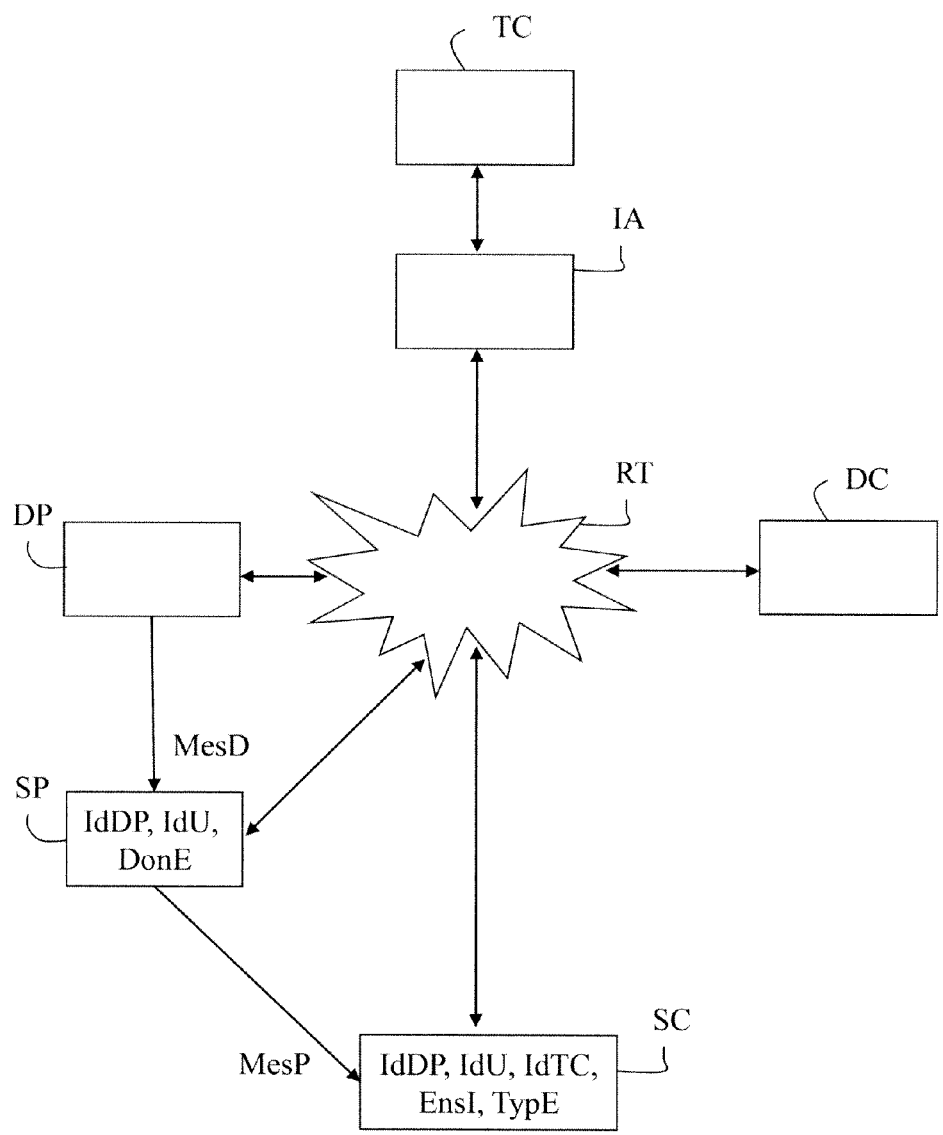

| | | |
|---|---|---|
| 2006/0072591 A1 | 4/2006 | Rogalski et al. |
| 2006/0142012 A1 | 6/2006 | Kirchhoff et al. |
| 2010/0105423 A1* | 4/2010 | Gupta .................. 455/550.1 |

* cited by examiner

TELEPHONIC SERVICE AND POWER SUPPLY STATUS MANAGEMENT OF A COMMUNICATION TERMINAL DEPENDING ON THE PRESENCE OF A USER

The present invention relates to a telephonic service and power supply status management of a communication terminal depending on the presence of a user. More particularly, the invention relates to managing the continuity of telephone service when communication terminals, such as telephones, are powered on or off, based on presence information regarding the users of those mutation terminals.

Currently, a communication terminal, such as a landline telephone, constantly consumes electrical power whenever it is plugged into the electrical grid, and remains constantly powered on.

Within the context of a company, each communication terminal is associated with at least one user, meaning that it is used specifically by that user in the office in which that user works. Whenever the user is absent from his or her office, the communication terminal remains powered on and needlessly consumes electrical power.

Additionally, that user may manually turn the communication terminal off and on to save energy. However, this manual action is performed occasionally, and remains a restriction for the user. Additionally, whenever the communication terminal is powered off manually, the user does not have any way to be contacted by a person who only knows the number at which to call the communication terminal.

It is an objective of the invention to remedy the aforementioned drawbacks by automatically managing the powering off or on of a communication terminal of a user while guaranteeing continuity of telephone service with respect to the user.

To achieve this objective, a method for managing a continuity of telephone service in relation to a user who is associated with a landline telephone communication terminal and at least one communication device, the communication terminal and the communication device being connected to a communication server, is characterized in that it comprises the following steps:

detecting an event relating to the absence of the user close to the communication terminal, powering off the communication terminal following the detection of said event, and activating call forwarding from a number of the communication terminal to a number of the communication device depending on a profile of the user.

Advantageously, the communication terminal is automatically powered off when the user is absent and no longer close to the communication terminal. The communication terminal therefore no longer consumes electrical power when the user is absent. Furthermore, although the communication terminal is powered off, the user can still be contacted via the communication device, which may, for example, be a voice messaging server, a landline telephone at the user's home, or a mobile radio communication telephone of the user.

Furthermore, because the communication terminal is powered off when the user is absent, no other person can use the communication terminal, which limits any potential fraudulent usage of the communication terminal.

In other characteristics of the invention, the event related to the user's absence may correspond to the user leaving a given geographic area, or the start of a predefined interval of time.

In another characteristic of the invention, the method may further comprise the following steps:

detecting an event relating to the presence of the user close to the communication terminal, powering on the communication terminal following the detection of said event, and deactivating the call forwarding from the number of the communication terminal to the number of the communication device.

In other characteristics of the invention, the event relating to the presence of the user may correspond to the user entering a given geographic area, or to the end of a predefined interval of time.

Advantageously, the communication terminal is automatically powered on when the user is close to the communication terminal. The communication terminal therefore does not consume electrical power throughout the user's entire absence.

The invention also pertains to a server for managing a continuity of telephone service in relation to a user who is associated with a landline telephone communication terminal and at least one communication device, the communication terminal and communication device being connected to the server, characterized in that it comprises:

means for powering off the communication terminal, following the detection of an event related to the absence of the user close to the communication terminal, and means for activating call forwarding from a number of the communication terminal to a number of the communication device depending on a profile of the user.

In another characteristic of the invention, the server may further comprise:

means for powering on the communication terminal, following the detection of an event related to the absence of the user close to the communication terminal, and means for deactivating the call forwarding from the number of the communication terminal to the number of the communication device.

Figure 2:
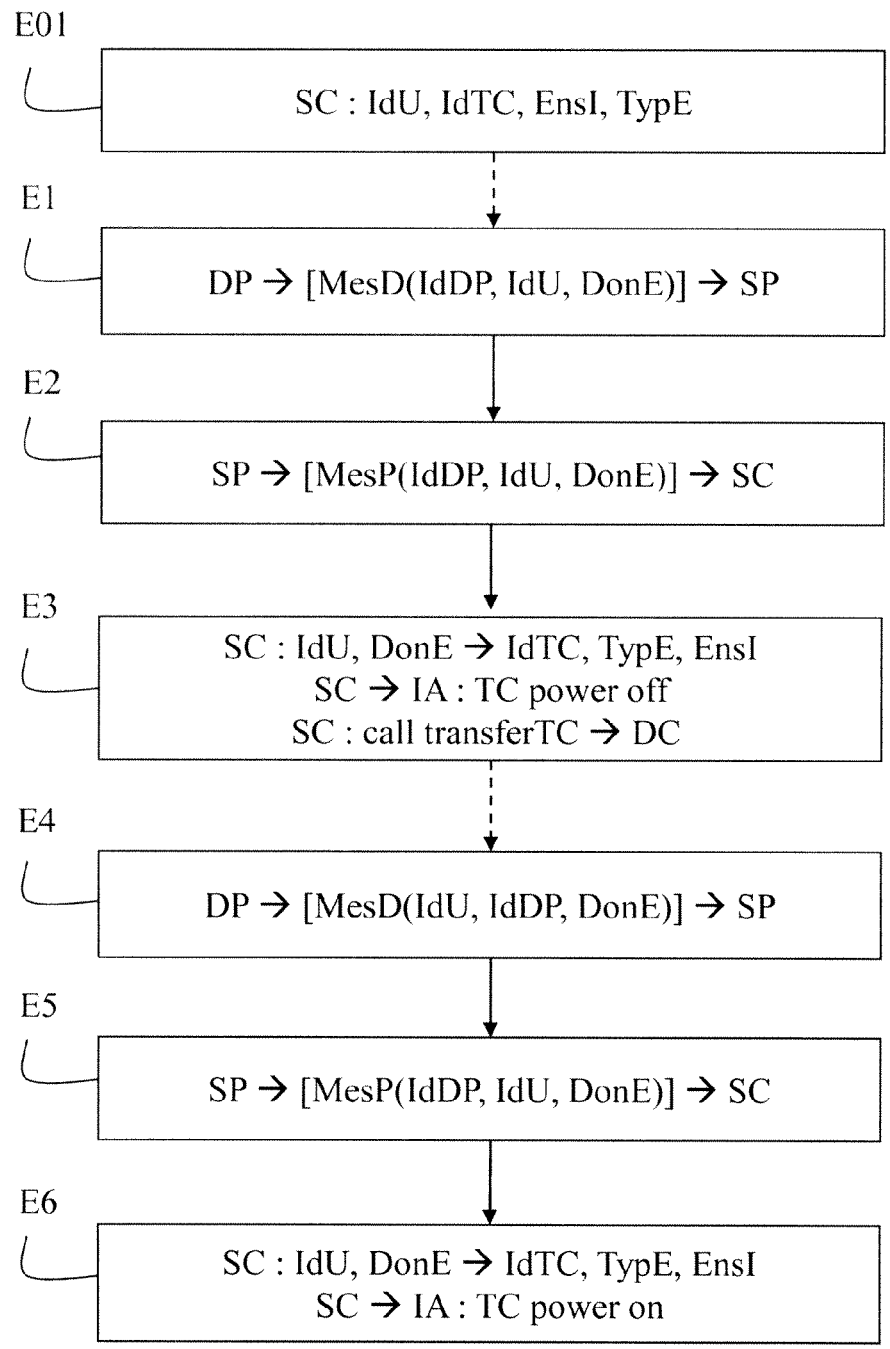

The present invention and the benefits thereof shall be better understood upon examining the description below, which makes reference to the attached figures, in which:

FIG. 1 is a schematic block diagram of a telecommunication system according to one embodiment of the invention for managing telephone service in relation to a user; and FIG. 2 is an algorithm of a method for managing telephone service in relation to a user.

With reference to FIG. 1, a telecommunication system according to one embodiment of the invention comprises at least one presence detector DP, a presence server SP, a communication server SC, at least one communication terminal TC of a user, and at least one communication device DC of the user, connected to one another by means of a telecommunications network RT.

The telecommunications network RT may be a wired or wireless network, or a combination of wired and wireless networks.

In one example, the telecommunications network RT is a high-speed IP ("Internet Protocol") packet network, such as the Internet or an intranet.

In another example, the telecommunications network RT is a TDM ("Time Division Multiplexing") network or a private network specific to a company supporting a proprietary protocol.

A communication terminal TC of a user is connected to the communication server SC over the telecommunications network RT.

For example, the communication terminal TC is a TDM landline telephone or a voice-over-IP landline telephone. In another example, the communication terminal TC is a POE ("Power Over Ethernet") landline telephone that is powered via an Ethernet connection, without being plugged into the electrical grid.

The communication terminal TC is associated with a power interface IA, which may be a housing comprising a switch that is plugged into the electrical grid. The power interface IA controls the electrical powering of the landline telephone and makes it possible to power the communication terminal TC either on or off.

Whenever the communication terminal TC is powered on, it may be in a normal mode in which all of the terminal's features are available, or in a restricted mode, such as a "standby" mode, in which only some predefined features of the terminal are available. Regardless of the mode that the terminal is in, it is still consuming power when it is powered on.

In a POE telephone, the power interface IA may be incorporated into the telephone, without being plugged into the electrical grid. Powering off the telephone also makes it possible to save on the energy needed to power the telephone.

Each communication terminal TC is associated with a user, who is, for example, the owner of the telephone or the only person to whom the telephone is assigned in an office, for example. In one variant, a communication terminal TC may be associated with multiple users.

The power interface IA is connected to the communication server SC via the telecommunications network RT. The power interface IA communicates with the communication server SC, such as via the Ethernet protocol. The power interface IA is ordered by the server SC to enter a state such as "circuit open" to power off the communication terminal, or to enter another state such as "circuit closed" to power on the communication terminal. The communication server SC orders the power interface depending on a message received from the presence server SP.

The presence server SP transmits a message the communication server SC following the detection of an event related to an absence or presence of the user close to the communication terminal TC. Such an event is detected by a presence detector DP connected to the presence server SP.

The presence server SP may be informed of an event detected over time, with the event corresponding to the start or end of a predefined interval of time. For example, an interval of time is a predefined timespan corresponding to a planned time of user presence or absence in the room in which the communication terminal TC is located. In the context of a company, an interval of time may correspond to a predefined timespan during which it is planned that the user will be present in the office, such as 8 AM to 8 PM. In this situation, a presence detector DP may be likened to a software module controlling the scheduled hours related to the user. More specifically, other intervals of time may correspond to timespans of a day planner defined by the user, such timespans being related to the user's absences, such as for business trips. In this situation, a presence detector DP may be likened to a software module managing a day planner of the user.

The presence server SP may be informed of an event detected within a given geographical area, the event corresponding to the user entering or exiting a geographical area in which the communication terminal is located. For example, this event is detected by an RFID ("Radio Frequency IDentification") tag, by means of a badge of the user for accessing said area. For example, in the context of a company, a geographical area may be the company's site, a building of the company in which the user works, or the user's office. In this situation, a presence detector DP may be likened to an access point of the geographical area.

In another example, the presence server SP may be informed of the user's presence when the user logs in on his or her personal computer that is connected to the company's network and which is assumed to be located close to the communication terminal TC. In this situation, a presence detector DP may be likened to a software module included within the personal computer that checks the user's login and logoff.

Generally speaking, the functionality of a presence detector DP is to detect whether a user is present or absent close to the communication terminal TC. The user may be considered close to the communication terminal for example whenever the user is capable of seeing or hearing the communication terminal, or more generally speaking, when the user is at the location of the communication terminal, meeting in the same room, or the same building, or the same site. With respect to an event detected over time, the user may be considered close to the communication terminal for example during a timespan during which the user is planned to be at work, or more specifically, in his or her office.

In one particular embodiment, a presence detector DP may be included within the communication terminal TC and capable of communicating with an equipment of the user, such as a mobile telephone. Whenever the communication terminal TC is powered off, the detector DP may be powered by a battery or a capacitor. For example, the presence detector DP may detect the user's presence whenever a WiFi or Bluetooth connection is established with a mobile telephone of the user.

According to one embodiment of the invention, whenever a presence detector DP detects an event, the detector transmits a message, hereafter known as a detection message MesD, to the presence server SP in a predefined format.

The message MesD contains an identifier IdDP of the presence detector DP, an identifier IdU of the user, and event data DonE related to the detected event. In a first example, the presence detector DP is a software module managing a day planner of the user, and the event data DonE relates to the start or end of a predefined timespan. In a second example, the presence detector DonE may be an access point to a geographic area, and the event data DonE relates to the date and time of the user's RFID badge's identification as well of the type of the user's action, which may correspond to the user entering or exiting the area.

Following the receipt of the detection message MesD transmitted by the presence detector DP, the presence server SP transmits a message, hereafter known as the presence message MesP, to the communication server SC. For example, the message MesP contains the identifier IdDP of the presence detector DP, the user's identifier IdU, and the event data DonE optionally changed into a different format.

Following the receipt of the presence message MesP transmitted by the presence server SP, the communication server SC orders the power interface IA to power off the communication terminal or to power on the communication terminal, and orders at least one action to ensure a continuity of telephone service in relation to the user in the event that the communication terminal is powered off.

To that end, the communication server SC identifies an identifier IdTC of the communication terminal associated with the user's identifier IdU, for example in a lookup table. The communication server SC determines the address of the power interface IA associated with a communication terminal and transmits a request to the power interface to order the powering on or off of the communication terminal depending on the event data DonE. For example, the communication server analyzes the event data DonE to determine whether the user is present or absent close to the communication terminal.

In a first example, if the event data DonE relate to the user entering a given geographic area or a time when the user arrives at work, the server SC orders the user's communication terminal to be powered off. In a second example, if the event data DonE relates to the user leaving a given geographic area or a time when the user leaves work, the server SC orders the user's communication terminal to power off.

Optionally, prior to the powering off of the communication terminal, the terminal may produce an audible and/or visual notification to alert the user, if he or she is still present, that the terminal will be powered off. The notification may, for example, be produced several minutes before the communication terminal is powered off.

In the event that the communication server orders the powering off of the user's communication terminal, the server executes at least one action to ensure a continuity of telephone service in relation to the user, the action being defined by a set of instructions associated with the user's identifier IdU, for example in a profile of the user associated with the user's identifier IdU.

In one embodiment of the invention, the user initially fills out a user profile to indicate one or more communication devices DC from which the user may be called, or may consult a message left by another user. For example, a communication device DC may be a voice messaging server, or a landline telephone at the user's home, or a mobile radio communication telephone. For example, the user profile contains a number for calling a voice messaging server and/or at least one number for calling another communication terminal of the user.

In order to ensure continuity of telephone service, the communication server SC activates a call forwarding functionality from the number of the communication terminal TC to the number of the user's communication device DC. Optionally, the call forwarding is configured based on a sequence of calls, corresponding, for example, to a call to a first communication device that is a landline telephone, then to a call to a second communication device that is a mobile telephone, then to a call to a third communication device that is a voice messaging server.

For example, the communication server SC is a PABX switch ("Private Automatic Branch eXchange"). The communication server SC comprises means, such as software or a combination of hardware and software, configured particularly to order the communication terminal to be powered on or off and to activate or deactivate call forwarding from the communication terminal to a communication device.

Managing events and continuity of phone service in relation to a user within the communication server SC may partially be defined by a system administrator, and partially defined by the user via a software interface in a personal computer, for example.

Furthermore, a priority may be assigned to some types of events in relation to other types of events. For example, the powering on of the communication terminal is scheduled for 9:00 AM, and the powering off of the communication terminal is scheduled for 6:00 PM. If the user's arrival at a given geographic area of the company is detected before 9:00 AM, for example by an RFID identification, then the communication terminal is powered on when the user's arrival is detected. Furthermore, depending on the configuration chosen, the powering off of the communication terminal may be executed only when the user's departure is detected before or after 6:00 PM, or alternatively may be executed only at 6:00 PM regardless of when the user departs. Optionally, if the powering off of the communication terminal is scheduled for 6:00 PM and the user is still present at 6:00 PM, the user may be notified, by an audible and/or visual notification, that the terminal will be powered off. The communication terminal may be powered off after said notification with a predetermined time delay allowing the user to potentially cancel the powering off of the communication terminal.

With reference to FIG. 2, a method for managing telephone service according to one embodiment of the invention comprises steps E1 to E6 executed within the telecommunications system. The method is described below in relation to a communication terminal TC associated with a user who is initially present within an office where the communication terminal is located.

In a preliminary step E01, a profile of the user is created within the communication server SC. For example, this profile is saved in the form of a lookup table within a database, and the lookup table particularly contains an identifier IdU of the user, an identifier IdTC of the communication terminal, and sets of instructions Ensl respectively associated with types of events TypE.

Furthermore, a presence detector DP, which is an access point to the office, is configured to detect whether the user is entering or leaving the office by an RFID identification.

In step E1, the presence detector DP detects an event related to the absence of the user close to the communication terminal. The event corresponds to the user leaving the office, which is a given geographical area in which the communication terminal is located. The presence detector DP transmits a detection message MesD to the presence server SP in a predefined format. The message MesD contains an identifier IdDP of the presence detector DP, an identifier IdU of the user, and event data DonE related to the detected event. The event data DonE particularly contains the identification date of the user's RFID badge, and a type of action indicating that the user is leaving the office.

In step E2, the presence server SP transmits a presence message MesP to the communication server SC. The message MesP contains the identifier IdDP of the presence detector DP, the user's identifier IdU, and the event data DonE.

Optionally, the presence server SP analyzes the event data DonE and converts them into another format that can be interpreted by the communication server SC. Furthermore, the presence server SP can interpret the event data DonE to give them an explicit notification of the user's presence or absence. In the previous example when the user is detected leaving the office, the server SP may add a data field noting the user's absence, or potentially restrict the content of the event data to such a data field.

In step E3, the communication server SC identifies the identifier IdTC of the communication terminal associated with the user's identifier IdU in the lookup table. The communication server SC analyzes the event data DonE to deduce from it the event type TypE that is, for example, defined by "absence".

The communication server SC determines the address of the power interface IA associated with the communication terminal, previously identified by its identifier IdTC, and executes the set of instructions Ensl associated with the event type TypE. For example, based on the set of instructions Ensl, the server SC transmits a request to the power interface IA to order the powering off of the communication terminal. Furthermore, the communication server SC activates a call forwarding functionality from the number of the communication terminal TC to the number of the user's communication device DC, which is a mobile radio communication telephone.

Thus, the user's communication terminal TC is automatically powered off after the user leaves, and no longer consumes electrical power. Whenever a person calls the user with the communication terminal's number, the call is redirected to the user's mobile phone.

In step E4, the presence detector DP detects an event related to the user's presence close to the communication terminal TC. The event corresponds to the user entering the office, and transmits a detection message MesD to the presence server SP. The message MesD contains the identifier IdDP of the presence detector DP, the user's identifier IdU and event data DonE related to the detected event. The event data DonE particularly contains the identification date of the user's RFID batch, and a type of action indicating that the user has entered the office.

In step E5, the presence server SP transmits a presence message MesP to the communication server SC, which also contains the identifier IdDP of the presence detector DP, the user's identifier IdU, and the event data DonE.

In step E6, the communication server SC identifies the identifier IdTC of the communication terminal associated with the user's identifier IdU in the lookup table. The communication server SC analyzes the event data DonE to deduce from it the event type TypE that is, for example, defined by "presence".

The communication server SC, by executing the set of instructions Ensl associated with the event type TypE, transmits a request to the power interface IA to order the powering on of the communication terminal. Furthermore, the communication server SC deactivates the call forwarding feature from the number of the communication terminal TC to the number of the user's communication device DC Thus, the user's communication terminal TC is powered on automatically after the user arrives, and consumes electrical power again. The user may once again be called at the communication terminal TC.

Optionally, the lookup table saved within the communication server SC also contains identifiers IdDP of presence detectors DP associated with sets of instructions Ensl, in order to determine a priority of some types of events in relation to other types of events.

According to an example embodiment described below, another presence detector DP, which is a software module managing a day planner of the user, is configured to transmit a detection message MesD to the presence server SP based on times when the user is absent and present.

The presence detector DP detect an event related to the presence of the user close to the communication terminal, with the event corresponding to the timespan when the user or present or the end of an absence timespan, and the presence detector DP transmits a detection message MesD to the presence server SP. The message MesD particularly comprises the identifier IdDP of the present detector, the identifier IdU of the user, and event data DonE that contain, for example, the start date of the presence timespan and a type of action indicating that the user is present within the office. The presence server SP transmits to the communication server SC a presence message MesP whose content is similar to that of the detection message MesD.

The user's profile may be configured to establish processing priorities based on the presence detectors that are used, or to establish rules for processing a presence message received from a presence detector as a function of a presence message previously received from another presence detector. For example, for a given day, the day planner has saved a timespan when the user will be present at the office between 9 AM and 6 PM, in order to automatically power on the communication terminal at 9 AM and power it off at 6 PM. Based on said message processing rules, if the access point detects the user's arrival at the office before 9 AM, the communication server processes the presence message derived from the access point in order to power on the terminal, because no presence message derived from the day planner had been received before. Furthermore, when the day planner detects that it is 9 AM and transmits a message to the communication server, the server does not process the message because it has already received a message derived from the access point in order to power on the communication terminal.

The user's profile may also be configured in such a way as to establish those for processing presence messages received as a function of time. For example, the messages coming from the software module managing a day planner are processed only in the morning to power the terminal on at 8 AM, or are additionally processed for a long-term event such as a business trip in order to power off the terminal while the trip is ongoing.

Optionally, with the permission of the user and/or the company, information about the user's presence may be encrypted and gathered into a log related to the user, which a system administrator may have access to for investigative purposes, such as regarding a theft of the user's badge.

The invention claimed is:

1. A method for managing a continuity of telephone service in relation to a user who is associated with a landline telephone communication terminal and at least one communication device, the communication terminal and the communication device being connected to a communication server, the method comprising:

receiving via a presence detector a detection message indicating that an event related to the user's absence from the communication terminal has been detected, wherein the message includes an identifier of the presence detector, an identifier of the user, and event data related to the event;

updating a profile of the user with data based on the event;

determining a priority of the event in relation to other types of events;

sending a message to a power interface indicating that the communication terminal should be powered off, based on the detection of the event related to the user's absence from the communication terminal and the priority of the event; and activating call forwarding from a number of the communication terminal to the number of the user's communication device depending on a profile of the user.

2. The method according to claim 1, wherein the event related to the user's absence corresponds to the user leaving a given geographic area.

3. The method according to claim 1, wherein the event related to the user's absence corresponds to the start of a predefined interval of time.

4. The method according to claim 1, wherein the method further comprises:

receiving via the presence detector a detection message indicating that an event related to the presence of the user close to the communication terminal has been detected, wherein the message includes an identifier of the presence detector, an identifier of the user, and event data related to the event;

updating a profile of the user with data based on the event;

determining a priority of the event in relation to other types of events;

sending a message to the power interface indicating that the communication terminal should be powered on, based on the detection of the event related to the presence of the user close to the communication terminal and the priority of the event;

deactivating call forwarding from the number of the communication terminal to the number of the user's communication device.

5. The method according to claim 4, wherein the event related to the user's presence corresponds to the user entering a given geographic area.

6. The method according to claim 4, wherein the event related to the user's presence corresponds to the end of a predefined interval of time.

7. The method according to claim 1, wherein the communication device is a voice messaging server.

8. The method according to claim 1, wherein the communication device is a landline or mobile telephone of the user.

9. A communication server for managing a continuity of telephone service in relation to a user who is associated with a landline telephone communication terminal and at least one communication device, the communication terminal and the communication device being connected to the communication server, the communication server configured to:

receive via a presence detector a detection message indicating that an event related to the user's absence from the communication terminal has been detected, wherein the message includes an identifier of the presence detector, an identifier of the user, and event data related to the event;

update a profile of the user with data based on the event;

determine a priority of the event in relation to other types of events;

send a message to a power interface indicating that the communication terminal should be powered off, based on the detection of the event related to the absence of the user close to the communication terminal and the priority of the event; and activate a call forwarding from a number of the communication terminal to a number of the communication device depending on a profile of the user.

10. The server according to claim 9, wherein the server is further configured to:

receive via the presence detector a detection message indicating that an event related to the presence of the user close to the communication terminal has been detected, wherein the message includes an identifier of the presence detector, an identifier of the user, and event data related to the event;

update the profile of the user with data based on the event;

determine a priority of the event in relation to other types of events;

send a message to the power interface indicating that the communication terminal should be powered on, based on the detection of the event related to the presence of the user close to the communication terminal and the priority of the event; and deactivate the call forwarding from the number of the communication terminal to the number of the communication device.

* * * * *